(12) United States Patent
Riedel

(10) Patent No.: US 9,854,043 B2
(45) Date of Patent: Dec. 26, 2017

(54) MERGING HUMAN MACHINE INTERFACES OF SEGREGATED DOMAINS

(71) Applicant: Airbus Operations GmbH, Hamburg (DE)

(72) Inventor: Christian Riedel, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 172 days.

(21) Appl. No.: 14/572,034

(22) Filed: Dec. 16, 2014

(65) Prior Publication Data

US 2015/0180977 A1    Jun. 25, 2015

(30) Foreign Application Priority Data

Dec. 20, 2013   (EP) .................................. 13198907

(51) Int. Cl.
*G06F 3/00*   (2006.01)
*H04L 29/08*  (2006.01)
*G06F 9/44*   (2006.01)

(52) U.S. Cl.
CPC ............ *H04L 67/12* (2013.01); *G06F 9/4443* (2013.01)

(58) Field of Classification Search
CPC ..................................................... G06F 9/4443
USPC ................................................ 715/719, 822
See application file for complete search history.

(56) References Cited

U.S. PATENT DOCUMENTS

| | | | | |
|---|---|---|---|---|
| 5,870,100 A | * | 2/1999 | DeFreitas | G06T 11/40 345/441 |
| 6,677,964 B1 | * | 1/2004 | Nason | G06F 3/038 715/762 |
| 7,030,892 B1 | | 4/2006 | Gyde et al. | |
| 7,269,482 B1 | * | 9/2007 | Shultz | G06F 9/4443 340/988 |
| 9,300,779 B2 | * | 3/2016 | Langlois | H04M 1/6091 |
| 2003/0120423 A1 | * | 6/2003 | Cochlovius | G01C 21/3614 701/455 |
| 2004/0056890 A1 | * | 3/2004 | Hao | G06F 9/4443 715/744 |
| 2005/0177700 A1 | * | 8/2005 | Park | G06F 9/4443 711/202 |

(Continued)

FOREIGN PATENT DOCUMENTS

DE   10 2008 035 090 A1   3/2010

OTHER PUBLICATIONS

European Patent Office, European Search Report for European U.S. Pat. No. 13198907.1 dated Jul. 7, 2014.

(Continued)

*Primary Examiner* — William Titcomb
(74) *Attorney, Agent, or Firm* — Lorenz & Kopf, LLP

(57) ABSTRACT

A data processing device comprises a graphics processing component configured to obtain first graphic data being related to a first graphical human machine interface for control of a first network domain; one or more second graphic data, the one or more second graphic data being related to one or more second graphical human machine interfaces for control of one or more second network domains; and a display unit configured to display a human machine interface, wherein the main human machine interface comprises the first graphical human machine interface and at least one of the one or more second graphical human machine interfaces.

20 Claims, 3 Drawing Sheets

(56) References Cited

U.S. PATENT DOCUMENTS

| | | | | |
|---|---|---|---|---|
| 2005/0198189 | A1* | 9/2005 | Robinson | G06F 3/1454 709/217 |
| 2005/0280524 | A1* | 12/2005 | Boone | B60K 35/00 340/461 |
| 2006/0155429 | A1* | 7/2006 | Boone | B60K 35/00 701/1 |
| 2006/0176312 | A1* | 8/2006 | Kuno | G09G 5/14 345/589 |
| 2009/0203368 | A1* | 8/2009 | Marsyla | G06F 9/45512 455/418 |
| 2010/0020038 | A1 | 1/2010 | Vogel et al. | |
| 2011/0093846 | A1* | 4/2011 | Moinzadeh | B60R 25/00 717/178 |
| 2012/0017069 | A1* | 1/2012 | Bourd | G06F 9/3838 712/216 |
| 2012/0065815 | A1* | 3/2012 | Hess | B60K 37/00 701/2 |
| 2012/0072871 | A1* | 3/2012 | Seo | H04N 5/445 715/838 |
| 2012/0096404 | A1* | 4/2012 | Matsumoto | G06F 9/4443 715/822 |
| 2012/0192109 | A1* | 7/2012 | Stolle | G06F 9/4443 715/810 |
| 2012/0268294 | A1* | 10/2012 | Michaelis | G06F 9/4443 340/905 |
| 2013/0094557 | A1* | 4/2013 | Whitby-Strevens | H04L 1/0001 375/224 |
| 2013/0238165 | A1* | 9/2013 | Garrett | G06F 9/4443 701/2 |
| 2013/0244634 | A1* | 9/2013 | Garrett | G06F 9/4443 455/418 |
| 2014/0059426 | A1* | 2/2014 | Lee | G06F 17/212 715/273 |

OTHER PUBLICATIONS

Cockpit display system, retrieved from Wikipedia, the free encyclopedia on Jun. 27, 2014.

Integrated modular avionics, retrieved from Wikipedia, the free encyclopedia on Jun. 27, 2014.

* cited by examiner

MERGING HUMAN MACHINE INTERFACES OF SEGREGATED DOMAINS

CROSS-REFERENCE TO RELATED APPLICATIONS

This application claims priority to European Patent Application No. 13 198 907.1, filed Dec. 20, 2013, which is incorporated herein by reference in its entirety.

TECHNICAL FIELD

Embodiments described herein generally relate to human machine interfaces. More specifically, the present disclosure relates to a data processing device for providing a human machine interface that controls multiple network domains provided on board a vehicle, for example, on board an aircraft, a corresponding method, and a cabin management panel, for example, an aircraft cabin management panel, comprising the data processing device.

BACKGROUND

Nowadays, multiple networks are provided on board vehicles such as busses, trains, ships, and aircraft. For example, networks of modern aircraft normally comprise multiple separated (segregated) domains. A domain (or network domain) is usually formed by a subset of components or devices of the network that are registered with and served by a central server. For safety reasons, such separate domains must be strictly hardware and software segregated from each other on board of aircraft. Examples of such aircraft network domains are the Air Craft Domain (also often referred to as Aircraft Control Domain) (ACD), the Airline Information Services Domain (AISD) and the Passenger Information and Entertainment Services Domain (PIESD). The ACD provides flight-safety related control and cabin systems, the AISD provides airline business and administrative support, and the PIESD provides passenger entertainment such as In-Flight Entertainment (IFE). It goes without saying that different security levels are assigned to these different domains. Referring to the foregoing examples, the ACD has the highest security level.

Although the aircraft network domains are strictly separated, they are usually monitored and controlled on one display of a control panel. Each of the segregated network domains is usually monitored and controlled by means of a specific Human Machine Interface (HMI) assigned to the respective network domain. According to this approach, in one control panel, each different network domain has its own browser supporting its own HMI. Usually, one or more of such control panels are provided on board of aircraft for control of cabin components and devices such as lights and air conditioning inside the aircraft cabin. In addition, information associated with the cabin, cabin components or cabin devices may be displayed on such control panels, such as, for example, a passenger call or the current temperature. DE 10 2008 035 090 A1 and US 2010 020038 A1 describe examples of such control panels.

For safety reasons, a hardware switch is provided to switch between the different HMIs of the different domains as presented on the display of the control panel. The hardware switch can be controlled, for example, by a Field Programmable Gate Array (FPGA). As a consequence, only one HMI can be viewed at a time and can only be changed to another HMI by switching the hardware switch. Likewise, user inputs for inputting data via or into the HMIs, for example, via a touch screen or separate input unit, are specific for the respective HMI which is currently displayed so that the input can only be forwarded to the network domain associated with the respectively displayed HMI. In short, according to this approach, by hardware (e.g., the switch) and software (e.g., the separate HMIs) assure that there is no unwanted exchange of data between the different domains.

According to one refinement of this approach, unidirectional data communication from the domain with the highest security level (according to the above example, ACD) to the lower level security domains (the AISD and the PIESD in the above example) may be allowed. Such unidirectional data communication from the highest security domain to the lower security domains does not cause any safety concerns, as it is, for example, not safety critical that the ACD domain can influence the PIESD domain and thus, for instance, the IFE system.

Accordingly, there is a demand for an improved technique of providing human machine interfaces for segregated network domains.

According to a first aspect, a data processing device for providing a human machine interface for control of multiple network domains provided on board a vehicle, for example, on board an aircraft, is proposed. The data processing device comprises a graphics processing component and a display unit. The graphics processing component is configured to obtain first graphic data related to a first graphical human machine interface for control of a first network domain, for example, a first aircraft network domain, and one or more second graphic data. The one or more second graphic data are related to one or more second graphical human machine interfaces for control of one or more second network domains, for example, one or more second aircraft network, domains. The display unit is configured to display a human machine interface. The human machine interface comprises the first graphical human machine interface and at least one of the one or more second graphical human machine interfaces.

The human machine interface (which may also be referred to as graphical human machine interface) may be configured such that all elements or components, e.g., data fields or the like, contained in the first human machine interface and contained in at least one of the one or more second human machine interfaces is visible at the same time on the human machine interface. It also conceivable that the human machine interface allows switching from one human machine interface to the other by means of a touch input or the like. For example, the first human machine interface and at least one of the one or more second human machine interfaces may be contained in the same window or on the same page, but the at least one of the one or more second human machine interfaces or the first human machine interface may not be displayed. e.g., because it is hidden by another of the one or more second human machine interfaces and the first human machine interface. In this case, the non-displayed, e.g., hidden elements may be displayed, e.g., unhidden, by means of a user input.

A different level of security (security level) may be assigned to the first network domain in comparison with the one or more second network domains. In other words, the first network domain may have a different security level than the one or more second network domains. For example, the first network domain may have the highest security level. The one or more second network domains may have the same, similar or different security levels, respectively.

The first network domain may be an Air Craft Domain (Aircraft Control Domain) (ACD). The one or more second network domains may be or comprise an Airline Information Services Domain (AISD) and/or a Passenger Information and Entertainment Domain (PIESD). The number of network domains provided on board the vehicle, e.g., provided on board the aircraft, is not limited to any specific number. For example, two or more network domains may be provided. There may be one first network domain and one or more second network domains. For example, if there are three network domains, the graphics processing component may be configured to obtain first graphic data being related to a first graphical human machine interface for control of a first (aircraft) network domain, second graphic data being related to a second graphical human machine interface for control of a second (aircraft) network domain, and third graphic data being related to a third graphical human machine interface for control of a third (aircraft) network domain. The display unit may be configured to display a graphical human machine interface. The human machine interface may comprise the first graphical human machine interface, the second graphical human machine interface, and the third graphical human machine interface. Likewise, the types mentioned above by way of example are not limited to the ACD, AISD and PIESD. Just to mention one additional or alternative example, the one or more second network domains may be or comprise a Passenger Owned Devices Domain (PODD).

Each of the first and one or more second network domains may comprise one or more network systems, each of which may comprise any number of network components or network devices such as sensors, actuators and the like. When referring to network domains on board of an aircraft and more specifically to the ACD, the ACD may at least comprise a cabin system, the cabin system comprising one or more further systems such as an air-condition system. The air-condition system may comprise any number of sensors or actuators for carrying out operations related to air-conditioning.

The data processing device may comprise a first interface via which the data processing device is connectable to the first network domain. The data processing device may comprise a processing module such as an ARM module. The data processing device may comprise a first interface via which the data processing device is connectable to the first network domain. Similarly, one or more second data processing devices may respectively comprise a second interface via which each of the one or more second data processing devices is connectable to a respective one of the one or more second network domains.

According to a first embodiment, the data processing device may comprise a merging component configured to merge the first graphic data (which is related to the first graphical human machine interface) and at least one of the one or more second graphic data (which are respectively related to the one or more second graphical human machine interfaces). The merging component may be implemented on a low level hierarchy underlying the applications running on the data processing device. The merging component may comprise a window manager and a rendering component. The window manager may be configured to integrate at least one of the one or more second graphical human machine interfaces into the first graphical human machine interface. The rendering component may be configured to render the pixels of the human machine interfaces integrated into each other to form one single main human machine interface.

The graphics processing component may be configured to receive at least one of the one or more second graphic data via a bidirectional data connection. For example, for each of the one or more second graphic data, a bidirectional (duplex) data connection may be provided. Via the bidirectional data connection, the graphics processing component may receive the one or more second graphic data from the one or more second data processing devices, respectively, and the graphics processing component may transmit the one or more second graphic data to the one or more second data processing devices, respectively.

In accordance with a first conceivable variant of the first possible embodiment, the graphics processing component may be configured to obtain first operating data being related to the first network domain, e.g., the first aircraft network domain. The first operating data may be or relate to information about one or more components or devices arranged in the first network domain. Just to give on example, the first operating data may be related to a value measured by a sensor, e.g., a temperature sensor, arranged in the first network domain. For example, multiple values may be sensed by temperature sensors of an air-conditioning system and may be provided to the cabin system. The cabin system may form a human machine interface from the multiple sensed values and possibly further values from other systems within the cabin system and may provide the respective data related to the formed human machine interface to the network domain, e.g., the ACD. The human machine interface may then be regarded as the human machine interface for control of the first network domain.

The display unit may be configured to display the first operating data on the human machine interface or as part of the human machine interface. Alternatively or additionally to the first conceivable variant of the first possible embodiment, the data processing device may comprise an input unit configured to receive an input of first control data via the human machine interface. The first control data may be or relate to information for control of one or more components or devices arranged in the first network domain. Just to give one example, the first control data may be a target temperature value for driving an air-conditioning unit arranged in the first network domain, more precisely in an air-conditioning system of the cabin system of the first network domain. The input unit may be configured to forward the first control data to the graphics processing component of the data processing device. The data processing device may then forward the first control data via its interface to a server of the first network domain which is responsible for controlling the respective one or more components or devices of the first network domain based on the first control data.

In accordance with the first embodiment, the graphics processing component may be configured to receive the one or more second graphic data and one or more second operating data being related to the one or more second network domains, for example, one or more second aircraft network domains, via a common bidirectional data connection, respectively. The one or more second operating data may be or relate to information about one or more components or devices arranged in the one or more second network domains, respectively. Alternatively or additionally, the graphics processing component may be configured to transmit the one or more second graphic data and one or more second control data being related to the one or more second network domains, for example, one or more second aircraft network domains, over a common bidirectional data connection, respectively. The one or more second control data may be or relate to information for control of one or more components or devices arranged in the second network domains, respectively.

For each bidirectional data connection, a communication filter may be provided. Each communication filter may be configured to filter out graphic data, operating data, or control data that does not fulfill one or more predetermined criteria. In other words, the communication filter may be configured to let through only graphic data, operating data, or control data that fulfills the one or more predetermined criteria. Each communication filter may comprise the same or different sets of commands or data types, which are allowed to pass and which will be rejected. By comparing data transmitted over the bidirectional data connection with such sets of commands or data types, the communication filters allow the transmitted data to pass or not.

According to a second embodiment, the data processing device may comprise a graphic control unit such as a graphic controller. The graphic control unit, e.g., the graphic controller, may comprise the graphics processing component. In other words, the graphic control unit, e.g., the graphic controller, may be configured to obtain the first graphic data being related to the first graphical human machine interface and at least one of the one or more second graphic data.

According to a first variant of the first embodiment, the graphic control unit, e.g., the graphic controller, may be configured to write the first graphic data into a video buffer area (e.g., a frame buffer) assigned to the first human machine interface and to write at least one of the one or more second graphic data into a mask area of the video buffer area. The mask area may be at least a subarea of the video buffer area.

According to a second variant of the first embodiment, the graphic control unit, e.g. the graphic controller, may be configured to write at least one of the one or more second graphic data into a mask area which is separate from the video buffer area.

Independent of the exact configuration of the mask area, the graphic control unit. e.g., the graphic controller, may be configured to receive a control input that specifies the mask area.

The display unit may be configured to retrieve the first graphic data and at least one of the one or more second graphic data from the video buffer area and the mask area to form the human machine interface on the display unit. For example, if the mask area is configured as a subarea of the video buffer area, the display unit may read out all pixel data of one frame contained in the video buffer area. As the mask area is part of the video buffer area, the frame displayed on the display unit includes the pixel data contained in the video buffer area including the mask area. In consequence, the frame displayed on the display unit comprises the first human machine interface and at least one of the one or more second human machine interfaces dependent on the data contained in the mask area. By reading out several such frames, the human machine interface can be displayed for a certain time.

The display unit may be configured to display the human machine interface by alternately displaying the first graphic data and at least one of the one or more second graphic data at a frame repetition frequency (which may also be referred to as image repetition frequency or frame repetition rate or simply frame rate or frame frequency) that is higher than a predetermined threshold, e.g., a predetermined frame repetition frequency. The predetermined threshold may be chosen such that the human eye perceives the first human machine interface and at least one of the one or more second human machine interfaces not as individual frames. As the human eye and its brain interface, the human visual system, can process 10 to 12 separate images per second, the frame repetition frequency may be at least 50 Hz or 60 Hz or even higher. If such an image repetition frequency is chosen to alternately display the first and at least one of the one or more second human machine interfaces, a viewer perceives the first and the at least one of the one or more second human machine interfaces as one single human machine interface.

In accordance with the second possible embodiment, the data processing device may comprise a data obtaining component configured to receive at least one of the one or more second operating data being related to the one or more second network domains: for example, one or more second aircraft network domains, via a bidirectional data connection and/or to transmit at least one of the one or more second control data being related to the one or more second network domains, for example, one or more second aircraft network domains, via a bidirectional data connection. Regarding the one or more second operating data as well as the one or more second control data, it is referred to the exemplary explanations given above with respect to the first embodiment.

In accordance with the second embodiment, at least one of the one or more second graphic data may be transmitted to the graphic control unit. e.g., the graphic controller, separately from the transmission of the one or more second operating data.

For each bidirectional data connection, a communication filter may be provided. Each communication filter may be configured to filter out operating data or control data which does not fulfill one or more predetermined criteria. In other words, the communication may be configured to let through only operating data or control data which fulfills the one or more predetermined criteria as described with respect to the first embodiment.

As the graphical data may be transmitted separately from the operating data or control data, the communication filters may be simplified. For example, each of the communication filters may be configured to understand only simple commands, but does not have to distinguish between graphical data and operating or control data.

In accordance with the second embodiment, the data processing device may further comprise a switching component. The switching component may be configured and arranged to receive the at least one of the one or more second graphic data and to selectively forward one of the one or more second graphic data to the graphic controller. The switching component may be provided, for example, in case of a limited number of input ports at the graphic controller. The switching component may be controlled by a Field Programmable Gate Array (FPGA) or other suitable control devices. The FPGA may be used instead of other control devices for safety reasons.

According to a second aspect, a cabin management panel is provided. The cabin management panel may comprise the data processing device as described herein. For example, the cabin management panel may be an aircraft cabin management panel such as a flight attendant panel (FAP).

According to a third aspect, a method for providing a human machine interface for control of multiple network domains provided on board a vehicle, for example, on board an aircraft, is proposed. The method comprises: obtaining first graphic data being related to a first graphical human machine interface for control of a first network domain, for example, a first aircraft network domain, and one or more second graphic data, the one or more second graphic data being related to one or more second graphical human machine interfaces for control of one or more second network domains, for example, one or more second aircraft network domains; and displaying a human machine interface, the human machine interface comprising the first graphical human machine interface and at least one of the one or more second graphical human machine interfaces.

According to a fourth aspect, a computer program product is provided. The computer program product comprises program code portions for carrying out one or more of the steps of any one of the method aspects described herein, when the computer program product is run or executed on a computer system or on one or more computing devices (e.g., a microprocessor, a microcontroller or a digital signal processor (DSP)). The computer program product may be stored on a computer-readable recording medium, such as a permanent or rewritable memory.

All of the above described aspects may be implemented by hardware circuitry and/or by software.

Even if some of the above aspects are described herein with respect to a data processing device or cabin management panel, these aspects may also be implemented as a method or as a computer program for performing or executing the method. Likewise, aspects described as or with reference to a method may be realized by suitable units (even if not explicitly mentioned) in the data processing device, the cabin management panel or by means of the computer program.

BRIEF DESCRIPTION OF THE DRAWINGS

The various embodiments will hereinafter be described in conjunction with the following drawing figures, wherein like numerals denote like elements, and.

DETAILED DESCRIPTION

The following detailed description is merely exemplary in nature and is not intended to limit the embodiments or the application and uses of the embodiments. Furthermore, there is no intention to be bound by any theory presented in the preceding background of the embodiments or the following detailed description.

In the following description, for purposes of explanation and not limitation, specific details are set forth in order to provide a thorough understanding of the present disclosure. It will be apparent to one skilled in the art that the present disclosure may be practiced in other embodiments that depart from these specific details. For example, the skilled person will appreciate that the present disclosure may be practiced with other network domains differing from the specific examples discussed below to illustrate the present disclosure. Even if in the below the present disclosure is described only with respect to an aircraft and network domains provided on board an aircraft, the disclosure may equally be practiced in any other environment having network domains such as in other vehicles, e.g., busses, ships, trains or the like. Further, even if in the below the present disclosure is described only with respect to three specific aircraft network domains, the disclosure may equally be practiced in any other environment having a different number of network domains.

Those skilled in the art will further appreciate that functions explained herein below may be implemented using individual hardware circuitry, using software functioning in conjunction with a programmed microprocessor or a general purpose computer, using an application specific integrated circuit (ASIC) and/or using one or more digital signal processors (DSPs). It will also be appreciated that when the present disclosure is described as a method, it may also be embodied in a device (i.e., the data processing device described below or a control panel), a computer processor and a memory coupled to a processor, wherein the memory is encoded with one or more programs that perform the methods disclosed herein when executed by the processor.

Figure 1:
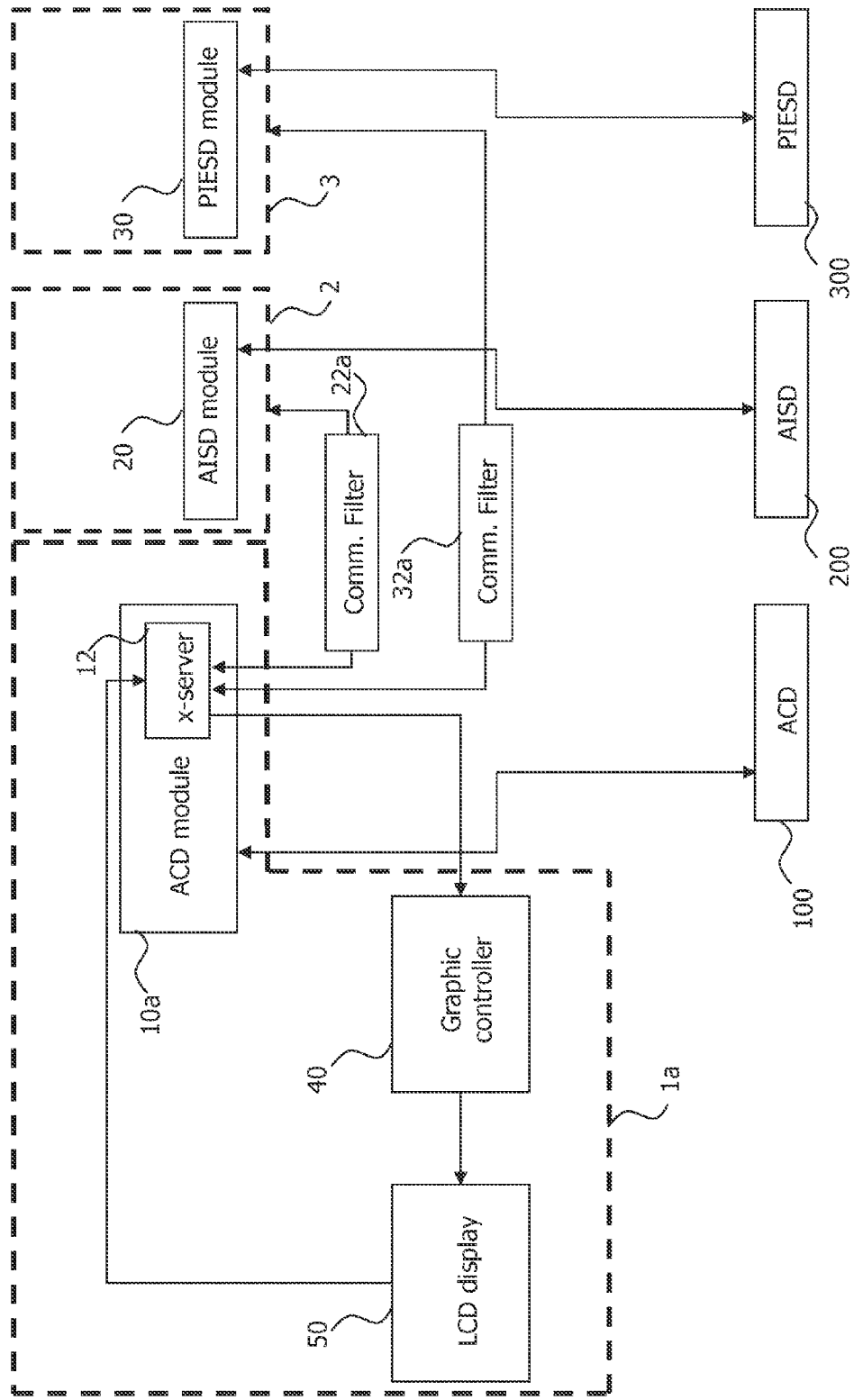
FIG. 1 schematically illustrates a first embodiment of a data processing device for providing a human machine interface for control of multiple network domains provided on board an aircraft.

FIG. 1 schematically illustrates a first embodiment of a data processing device 1a for providing a human machine interface that controls multiple network domains provided on board an aircraft. The data processing device 1a will in the following be referred to as first data processing device 1a. The first data processing device 1a comprises an interface via which it can be connected to a first network domain 100 of the aircraft. In the following it is assumed without limitation that the first network domain 100 is the Aircraft Control Domain (ACD) 100. The first data processing device 1a can, for example, be connected to the ACD 100 via Ethernet.

In FIG. 1, two second data processing devices 2 and 3 are shown that will in the following be referred to as second data processing device 2 and third data processing device 3. The second data processing device 2 comprises an interface via which it can be connected to a second network domain 200 of the aircraft. In the following it is assumed without limitation that the second network domain 200 is the Airline Information Services Domain (AISD) 200. The second data processing device 2 can be connected to the AISD 200 via Ethernet, for example. The third data processing device 3 comprises an interface via which it can be connected to a third network domain 300 of the aircraft. In the following it is assumed without limitation that the third network domain 300 is the Passenger Information and Entertainment Services Domain (PIESD) 300. The third data processing device 30 can be connected to the PIESD 300 via Ethernet, for example.

The first processing device 1a comprises an ARM module as an example of a processing module which is in the following referred to as ACD module 10a. Further, the first processing device 1a comprises a graphic controller 40. One or more software components may be running on the ACD module 10a including a software component which will be referred to as x-server 12 (the term x-server is often used with respect to Windows®). The x-server 12 comprises two software components, namely a window manager and a rendering component. The first processing device 1a further comprises a display unit 50 which is in the following exemplarily referred to as LCD display 50. In the following, it is exemplarily assumed without limitation that the LCD display 50 is touch sensitive in order to allow user inputs to be input into the first data processing device 1a. Alternatively, a separate user input device may be provided at the first data processing device 1a in order to receive user inputs.

The first data processing device 1a is connected to the second data processing device 2 and to the third data processing device 3. Each of the second and third data processing devices 2 and 3 comprises an ARM module. The ARM module of the second data processing device 2 is in the following referred to as the AISD 20 module and the ARM module of the third data processing device 3 is in the following referred to as the PIESD module 30. The ACD module 10a and the AISD module 20 are connected to each other via a bidirectional data connection via which data can be exchanged. The ACD module 10a and the PIESD module 30 are connected to each other via a bidirectional data connection via which data can be exchanged. On each of the bidirectional data connections, a communication filter 22a, 32a is respectively provided. The communication filters 22a, 32a are provided to allow only data exchange which meets one or more predetermined criteria. In this way, the communication filters 22a and 32a prevent unauthorized data from the AISD module 20 and PIESD module 30 to enter the ACD module 10a, the first data processing device 1a, and thus the ACD 100.

A first human machine interface (HMI) (which is in the following referred to as ACD HMI) can be provided by the first data processing device 1, e.g., the ACD module 10a, which allows input of control data for control of components or devices arranged in the ACD 100 and presentation of operating data providing information about components or devices arranged in the ACD 100. A second HMI (which is in the following referred to as AISD HMI) can be provided by the second data processing device 2, e.g., the AISD module 20, which allows input of control data for control of components or devices arranged in the AISD 200 and presentation of operating data providing information about components or devices arranged in the AISD 200. A third HMI (which is in the following referred to as PIESD HMI) can be provided by the third data processing device 3. e.g., the PIESD module 30, which allows input of control data for control of components or devices arranged in the PIESD 300 and presentation of operating data providing information about components or devices arranged in the PIESD 300.

The operation of the first data processing device 1a will now be explained.

Graphic data related to the ACD HMI (which is in the following referred to as ACD graphic data) is obtained by the x-server 12 from the first data processing device 1a itself. Further, the x-server 12 receives graphic data related to the AISD HMI (which is in the following referred to as AISD graphic data) from the second data processing device 2 via the bidirectional data connection and graphic data related to the PIESD HMI (which is in the following referred to as PIESD graphic data) from the third data processing device 3 via the bidirectional data connection. Further, operating data related to the ACD 100 (which is in the following referred to as ACD operating data) is obtained by the x-server 12 from the first data processing device 1a itself. Further, the x-server 12 receives operating data related to the AISD 200 (which is in the following referred to as AISD operating data) from the second data processing device 2 via the bidirectional data connection and operating data related to the PIESD 300 (which is in the following referred to as PIESD operating data) from the third data processing device 3 via the bidirectional data connection. The AISD module 20 and thus the second data processing device 2 may have retrieved the AISD operating data from the AISD 200. Likewise, the PIESD module 30 and thus the third data processing device 3 may have retrieved the PIESD operating data from the PIESD 300.

The communication filter 22a checks whether the AISD graphic data and AISD operating data are allowed to pass, e.g. because they correspond to certain standard data which are allowed to pass. The communication filter 32a checks whether the PIESD graphic data and PIESD operating data are allowed to pass, e.g. because they correspond to certain standard data which are allowed to pass. The standard data or commands which are allowed to pass the communication filters 22a and 32a are respectively stored in the communication filters 22a and 32a.

The data that are allowed to pass by the communication filters 22a and 32a are received by the x-server 12. The window manager of the x-server merges the ACD graphic data, the AISD graphic data and, the PIESD graphic data to merged graphic data. The rendering component renders the pixels of the merged graphic data, which is then forwarded to the graphic controller 40. The graphic controller buffers the merged graphic data in a frame or video buffer. Then, the LCD display 50 retrieves the merged graphic data and displays a merged HMI on the basis of the merged graphic data. In addition, the ACD module 10a may forward the AISD and PIESD operating data to the LCD display 50, which can then display the operating data on the merged HMI.

A user input can be received on a touch sensitive unit of the LCD display 50. As indicated by the arrow in the figure, the sensed user input can then be forwarded to the x-server 12. For example, a value presented on the merged HMI can be changed to a different value by the user input. The changed value can then be regarded as control data. When the changed value relates to the ACD 100, it can be regarded as ACD control data. When the changed value relates to the AISD 200, it can be regarded as AISD control data. When the changed value relates to the PIESD 300, it can be regarded as PIESD control data.

The respective control data is then forwarded to the x-server 12. From the x-server 12, the respective control data can be transmitted to the second data processing device 2 and/or the third data processing device 3. Again, the communication filters 22a and 32a are respectively able to allow or reject the control data. From the AISC module 20 and/or the PIESD module 30, the control data can be transmitted to the AISC 200 and/or the PIESD 300, e.g., to central servers of the AISD 200 and/or PIESD 300.

Figure 2:
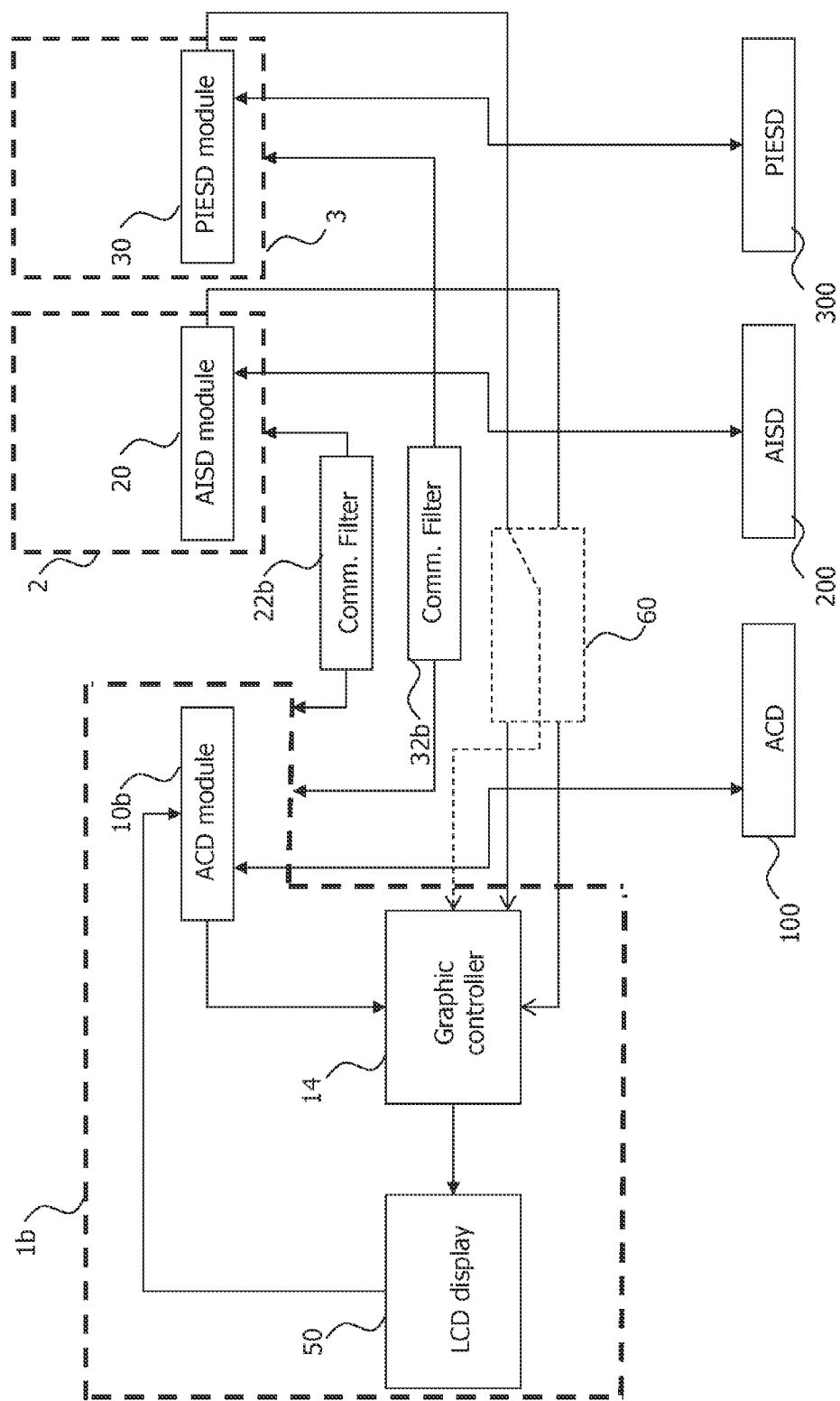
FIG. 2 schematically illustrates a second embodiment of a data processing device for providing a human machine interface for control of multiple network domains provided on board an aircraft.

FIG. 2 schematically illustrates a second embodiment of a data processing device for providing a human machine interface for control of multiple network domains provided on board an aircraft. For sake of efficiency, only the differences between the second device embodiment of FIG. 2 and the first device embodiment of FIG. 1 will now be mentioned and explained. All other elements respectively correspond to each other.

In contrast to the first device embodiment, only AISD operating data and PIESD operating data are transmitted from the second data processing device 2 and/or the third data processing device 3 to the first data processing device 1b over the bidirectional data connections. Likewise, AISD control data and PIESD control data are transmitted from the first data processing device 1b to the second data processing device 2 and/or the third data processing device 3 over the bidirectional data connections, but graphic data is not transmitted over the bidirectional data connections. Further, no x-server 12 is provided in the ACD module 10b. Instead, the AISD graphic data and the PIESD graphic data are transmitted from the second data processing device, e.g., from the AISD module 20, and the third data processing device 3, e.g., from the PIESD module 30, to a graphic controller 14. The graphic controller 14 serves as one possible realization of a graphic control unit. The graphic controller 14 also receives the ACD graphic data. Optionally, a switch 60 may be provided which receives the AISD graphic data and the PIESD graphic data but only forwards one of said graphic data dependent on the state of the switch.

As the graphic data on the one hand and the operating and control data on the other hand are transmitted separately, the complexity of the communication filters 22b and 32b can be greatly reduced. In other words, the communication filters 22b and 32b only need to consider whether the operating data and/or control data meet certain criteria or requirements, e.g., whether they correspond to predetermined commands or data types or the like.

Further details and the operation of the first data processing device 1b will now be explained with respect to FIG. 3. While in FIG. 2, the graphic controller 14 is shown as being separate from the ACD module 10b, in FIG. 3, the graphic controller 14 is part of (arranged on) the ACD module 10b. This is just to illustrate that both options are equally possible.

Figure 3:
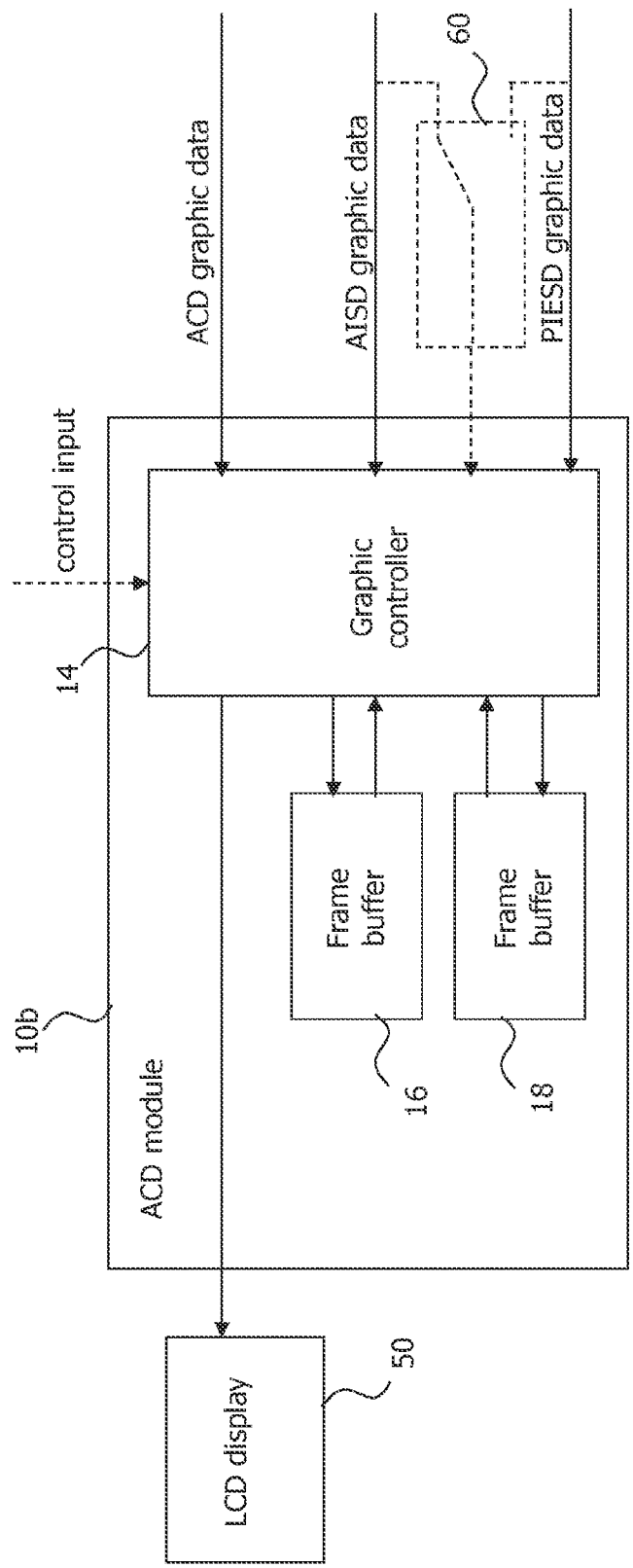
FIG. 3 schematically illustrates details of the graphic controller of the second embodiment of FIG. 2.

As can be seen from FIG. 3, the ACD graphic data are received by the graphic controller 14 from the ACD module 10b. The received ACD graphic data can then be written into a main video buffer of the graphic controller 14. The main video buffer may be reserved for the ACD graphic data and may thus be also referred to as ACD video buffer (or ACD frame buffer). The graphic controller 14 further receives AISD graphic data from the AISD module 20 and PIESD graphic data from the PIESD module 30. Alternatively, a switch 60 may be provided on the input side of the graphic controller 14. The switch 60 may receive the AISD graphic data from the AISD module 20 and PIESD graphic data from the PIESD module 30 and may forward only the AISD graphic data or PIESD graphic data depending on the state of the switch 14. The switch may be an FAPG.

The graphic controller 14 receives a control input from the ACD module 10b. The control input specifies a mask area into which the AISD and/or PIESD graphic data are to be written.

According to a first realization, the control input specifies that the mask area is a subarea of the ACD video buffer. The AISD and/or PIESD graphic data are then written into the mask area as specified by the control input. The subareas into which the AISD graphic data and the PIESD graphic data are written are, by way of example, named frame buffer 16 and 18 as they may be part of the ACD frame buffer. When the LCD display 50 reads out the pixel data stored in the ACD video buffer in order to form a frame to be displayed, the pixel data of the ACD graphic data and the AISD graphic data and/or the PIESD graphic data are displayed on the LCD display 50 as they are read out from the ACD video buffer, i.e., as they were stored in the ACD video buffer. Because the AISD graphic data and/or the PIESD graphic data were stored in respective subareas of the ACD video buffer, the result is that the LCD display 50 displays a merged HMI which comprises the ACD HMI and the AISD HMI and/or the PIESD HMI.

According to a second realization, the control input specifies a mask area which is separate from the ACD video buffer. In order to merge the separately buffered data, the LCD display 50 alternately reads out the ACD graphic data buffered in the ACD video buffer, the AISD graphic data stored in the AISD mask area, and the PIESD graphic data stored in the PIESD mask area. By alternately reading out said data and by displaying the ACD graphic data, the AISD graphic data and/or the PIESD graphic data with a frame repetition frequency of at least 50 Hz or 60 Hz, a merged HMI is perceived. The merged HMI comprises the ACD HMI and the AISD HMI and/or the PIESD HMI.

By means of the embodiments described above, it is reliably ensured that the segregated network domains 100, 200, 300 stay segregated although a common HMI is presented on the LCD display 50.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the embodiment in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the embodiment as set forth in the appended claims and their legal equivalents.

What is claimed is:

1. A data processing device for providing a human machine interface for control of multiple network domains provided on board a vehicle, the data processing device comprising:
    a graphics processing component configured to obtain first graphic data being related to a first graphical human machine interface for control of a first network domain and one or more second graphic data, the one or more second graphic data being related to one or more second graphical human machine interfaces for control of one or more second network domains;
    a communication filter configured to filter the one or more second graphic data obtained by the graphics processing component; and
    a display unit configured to display a human machine interface, wherein the human machine interface comprises the first graphical human machine interface and at least one of the one or more second graphical human machine interfaces,
    wherein the communication filter prevents graphic data that is unauthorized to enter the first network domain from entering the data processing device.

2. The data processing device of claim 1, further comprising a merging component configured to merge the first graphic data being related to the first graphical human machine interface and at least one of the one or more second graphic data being related to the one or more second graphical human machine interfaces;
    wherein the first graphic data and the at least one of the one or more second graphic data are merged by alternately reading out the first graphic data and the at least one of the one or more second graphic data to the display unit.

3. The data processing device of claim 1, wherein the graphics processing component is configured to receive at least one of the one or more second graphic data via the bidirectional data connection.

4. The data processing device of claim 1, wherein the graphics processing component is configured to obtain first operating data being related to the first network domain and the display unit is configured to display the first operating data on the human machine interface,
    wherein the data processing device comprises an input unit configured to receive an input of first control data via the human machine interface and the input unit is configured to forward the first control data to the graphics processing component.

5. The data processing device of claim 1, wherein the graphics processing component is configured to receive the one or more second graphic data and the one or more second operating data being related to the one or more second network domains via the common bidirectional data connection,
wherein the graphics processing component is configured to transmit the one or more second graphic data and one or more second control data being related to the one or more second network domains over a common bidirectional data connection.

6. The data processing device of claim 5, wherein the communication filter filters both the one or more second graphic data and the one or more second operating data.

7. The data processing device of claim 1, wherein the data processing device comprises a graphic control unit, wherein the graphic control unit, comprises the graphics processing component.

8. The data processing device of claim 7, wherein the graphic control unit is configured to write the first graphic data into a video buffer area assigned to the first human machine interface and to write at least one of the one or more second graphic data into a mask area of the video buffer area, the mask area being at least a subarea of the video buffer area.

9. The data processing device of claim 7, wherein the graphic control unit is configured to write at least one of the one or more second graphic data into a mask area, the mask area being separate from the video buffer area.

10. The data processing device of claim 7, wherein the graphic control unit is configured to receive a control input, the control input specifying the mask area.

11. The data processing device of claim 7, wherein the display unit is configured to retrieve the first graphic data and at least one of the one or more second graphic data from the video buffer area and the mask area to form the human machine inter-face on the display unit.

12. The data processing device of claim 7, wherein the data processing device is configured to receive at least one of one or more second operating data being related to the one or more second network domains via a bidirectional data connection, and/or to transmit at least one of one or more second control data being related to the one or more second network domains via a bidirectional data connection.

13. The data processing device of claim 7, wherein the data processing device further comprises a switching component configured to receive the one or more second graphic data and to selectively forward one of the one or more second graphic data.

14. The data processing device of claim 7, wherein the data processing device is configured to transmit at least one of one or more second control data being related to the one or more second network domains via a bidirectional data connection.

15. The data processing device of claim 1, wherein the communication filter filters graphic data based on whether the graphic data is in a predetermined set of command types of data types.

16. The data processing device of claim 1, further comprising a bidirectional data connection between the graphics processing component and the one or more second graphical human machine interfaces;
wherein the communication filter is configured to filter data transmitted through the bidirectional data connection; and
wherein the communication filter prevents graphic data that is unauthorized to enter the one or more second network domains from entering the one or more second graphical human machine interfaces.

17. The data processing device of claim 16, further comprising a switch connected between the graphics processing component and the one or more second graphical human machine interfaces, in parallel with the bidirectional data connection;
wherein the switch is configured to selectively forward graphical data from the one or more second graphical human machine interfaces to the graphics processing component; and
wherein control and operating data is transmitted over the bidirectional data connection.

18. A data processing device for providing a human machine interface for control of multiple network domains provided on board a vehicle, the data processing device comprising:
a display unit is configured to display the human machine interface by alternately displaying the first graphic data and at least one of the one or more second graphic data at a frame repetition frequency which is higher than a predetermined frame repetition frequency,
wherein the graphic control unit is configured to write at least one of the one or more second graphic data into a mask area, the mask area being separate from the video buffer area,
wherein the data processing device comprises a graphic control unit, wherein the graphic control unit, comprises the graphics processing component,
a graphics processing component configured to obtain first graphic data being related to a first graphical human machine interface for control of a first network domain and one or more second graphic data, the one or more second graphic data being related to one or more second graphical human machine interfaces for control of one or more second network domains;
a communication filter configured to filter the one or more second graphic data obtained by the graphics processing component; and
a display unit configured to display a human machine interface, wherein the human machine interface comprises the first graphical human machine interface and at least one of the one or more second graphical human machine interfaces,
wherein the communication filter filters out graphic data that is unauthorized to enter the first network domain.

19. A method for providing a human machine interface for control of multiple network domains provided on board a vehicle, the method comprising:
obtaining first graphic data being related to a first graphical human machine interface for control of a first network domain and one or more second graphic data being related to one or more second graphical human machine interfaces for control of one or more second network domains;
preventing one or more second graphic data that is unauthorized to enter the first network domain from entering the data processing device; and
displaying a human machine interface, the human machine interface comprising the first graphical human machine interface and at least one of the one or more second graphical human machine interfaces.

20. A data processing device for providing a human machine interface for control of multiple network domains provided on board a vehicle, the data processing device comprising:

a graphics control unit configured to obtain first graphic data being related to a first graphical human machine interface for control of a first network domain and one or more second graphic data, the one or more second graphic data being related to one or more second graphical human machine interfaces for control of one or more second network domains; and a display unit configured to display a human machine interface, wherein the human machine interface comprises the first graphical human machine interface and at least one of the one or more second graphical human machine interfaces;

wherein the graphic control unit is configured to write at least one of the one or more second graphic data into a mask area, the mask area being separate from the video buffer area; and wherein the display unit is configured to display the human machine interface by alternately displaying the first graphic data and at least one of the one or more second graphic data at a frame repetition frequency which is higher than a predetermined frame repetition frequency.

* * * * *